United States Patent [19]

Kawatsu

[11] Patent Number: 4,653,777
[45] Date of Patent: Mar. 31, 1987

[54] ARTICULATE BENT PIPE FOR TRANSPORTATION OF POWDER AND SLURRY IN DRY OR WET STATE

[75] Inventor: Hajime Kawatsu, Osaka, Japan

[73] Assignee: Ing Shoji Co., Ltd., Osaka, Japan

[21] Appl. No.: 831,315

[22] Filed: Feb. 20, 1986

[30] Foreign Application Priority Data

Feb. 23, 1985 [JP] Japan .................................. 60-3511

[51] Int. Cl.⁴ ................................................ F16L 9/14
[52] U.S. Cl. ..................................... 285/16; 285/55; 285/179; 406/193
[58] Field of Search ..................... 285/16, 55, 179; 406/193, 195

[56] References Cited

U.S. PATENT DOCUMENTS

| | | | |
|---|---|---|---|
| 1,211,784 | 1/1917 | Stuart | 406/193 |
| 1,272,794 | 7/1918 | Girtannes | 285/16 |
| 1,960,412 | 5/1934 | Doming | 285/16 |
| 3,794,359 | 2/1974 | Fisher | 285/179 |
| 4,117,201 | 9/1978 | Keifert | 285/55 |
| 4,130,300 | 12/1978 | Sheridan | 285/16 |

FOREIGN PATENT DOCUMENTS

| | | | |
|---|---|---|---|
| 307855 | 9/1918 | Fed. Rep. of Germany | 285/16 |
| 0508963 | 10/1930 | Fed. Rep. of Germany | 285/16 |
| 806254 | 6/1951 | Fed. Rep. of Germany | 406/193 |
| 2521256 | 8/1983 | France | 285/179 |
| 0016809 | 2/1980 | Japan | 406/193 |
| 1563784 | 4/1980 | United Kingdom | 285/179 |

Primary Examiner—Cornelius J. Husar
Assistant Examiner—Anthony Knight
Attorney, Agent, or Firm—Oblon, Fisher, Spivak, McClelland & Maier

[57] ABSTRACT

An articulate bent pipe for transport of powder and slurry is composed of a plurality of sector shaped nodular pipes having a wear resistant pipe lining applied on the interior thereof and packing means positioned between each nodular pipe. The nodular pipes are secured together to form the bent pipe. Steps are formed between axial edges of adjacent inner surfaces of the linings for upstream nodular pipes.

5 Claims, 5 Drawing Figures

ARTICULATE BENT PIPE FOR TRANSPORTATION OF POWDER AND SLURRY IN DRY OR WET STATE

BACKGROUND OF THE INVENTION

1. Field of the Invention

The present invention relates to an articulate assembled bent pipe adaptable as a pipe for transportation of powder or slurry in dry or wet state, which is wear resistant and which permits easy partial replacement or repair when it has been worn.

2. Discussion of the Related Art

Pneumatic transporting methods are employed for transporting fine powder coal, clinker, fly ash, casting sand, earth and sand, etc., at iron works, cement factories, thermoelectric power stations and foundaries, etc. Such transporting pipes often sustain severe wear from conveying the media. The wearing is especially conspicuous at the inner surface on the outer bent side of the bent pipe, which is locally eroded in grooves where pitting finally develops, for which repair or total replacement is required.

According to a method generally practiced as a countermeasure against wear of bent pipes for uses of this kind, a bent pipe made of soft steel or carbon steel is used. A box shape reinforcing member is initially attached on the outside of the bent pipe in anticipation of the development of pitting. Then a material which has wear resistance, such as concrete or refractory brick, etc., is prelimilinarily filled in the box, so that the bent pipe may be protected against possible leakage of transport medium by a layer concrete or brick, to prevent material leakage to outside, even if a pit is formed in the bent pipe while in use. This method is undesirable, because the weight of the bent pipe is increased and when the inner surface of the pipe's radially outward bent side is pitted, turbulent flow of transport medium will result, whereby suction force is reduced.

For transport of abrasive media like fly ash or casting sand which cause violent grinding wear, wear resistant cast irons, e.g., high carbon or high chrome cast iron or NI-HARD (trade name) cast iron, etc., have been used and irregular thickness bent pipes with increased thickness at their outer bent side which tends to sustain especially violent abrasion have been manufactured and used. However, even such wear resistant cast irons do not assure long life. When, for example, a bent pipe of high chrome cast iron with its outwardly bent side having a thickness of 30 mm was used in transporting fly ash, pitting developed in approximately 4-6 months.

Once wear resistant cast iron of this type is pitted, its repair by welding is difficult and such welding, if done improperly, might invite cracking and rupture. At present, a leakage proof method of padding the pitted part with a thick plate of soft steel and welding its circumference has been adopted, but after repetition of this method 2-3 times, the pipe body will crack and total replacement will become necessary.

In the case of slurry like pneumatic transport or sand transport by use of pumps, the form of wear by the transport media tends to be erosion or erosion wear which involves local wear. Thus only a very small part of the total weight of the bent pipe will need repair or replacement, resulting in notable bad economy. Accordingly, the development of bent pipes of a material which assures long life and of a construction which permits easy repair is necessary.

SUMMARY OF THE INVENTION

The present invention has as its object to provide a bent pipe which not only assures long life, but permits easy repair.

The present invention has as a further object to provide an articulate bent pipe for transport of powder or slurry in dry or wet state, which is composed of sector-shaped nodular pipes defined by splitting the angle R of the bent pipe into a predetermined number of split angles $\alpha$ with a lining of wear resistant pipe of the required thickness provided on each of said nodular pipes, each two of said nodular pipes being coupled through a packing consecutively and replaceably and in which the axial edge of each wear resistant pipe on the inside surface at the radially outward side of each bent pipe is formed lower (i.e. further from the pipe axis) than the adjacent edge of the upstream adjacent wear resistant pipe, except for the downstream nodular pipes.

DETAILED DESCRIPTION OF THE PREFERRED EMBODIMENTS

Figure 1:
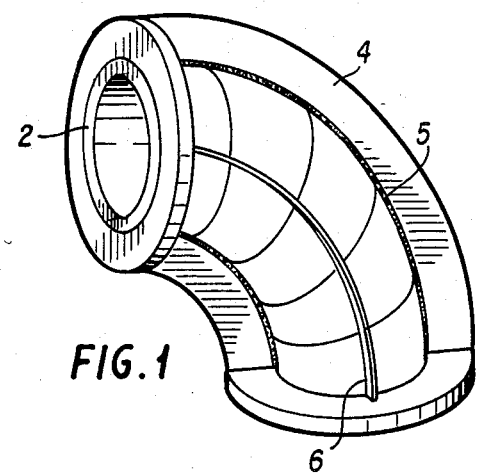
FIG. 1 is a perspective view of an articulate bent pipe illustrating this invention.
Figure 2:
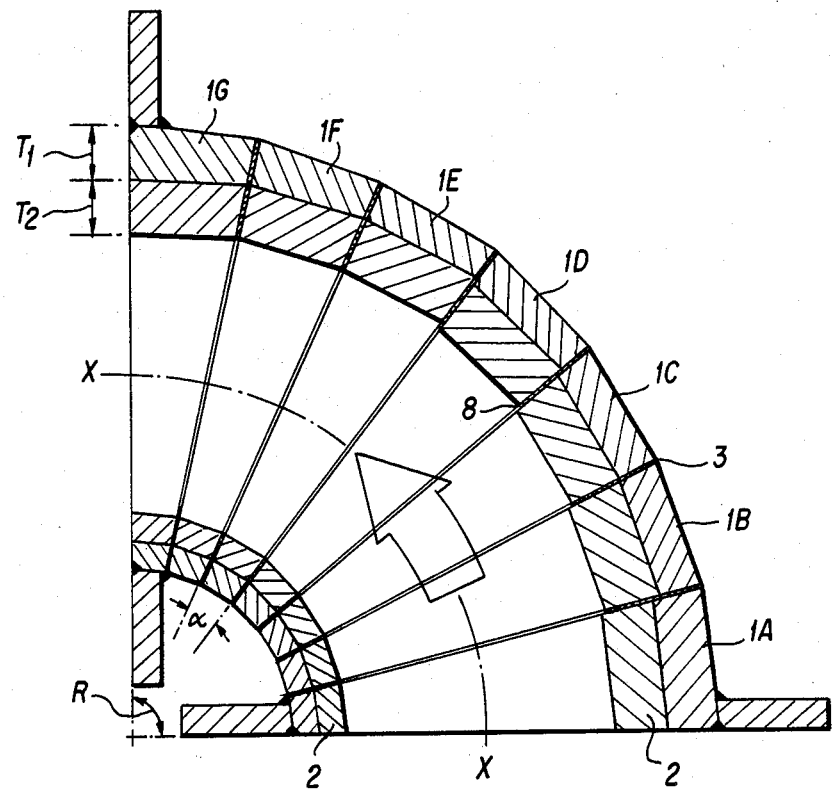
FIG. 2 is a sectional view of the pipe of FIG. 1 from which the flat bars are removed.

FIG. 1 is a perspective view illustrating a 90° bent pipe of this invention, and FIG. 2 is a sectional view taken through its center.

Figure 3:
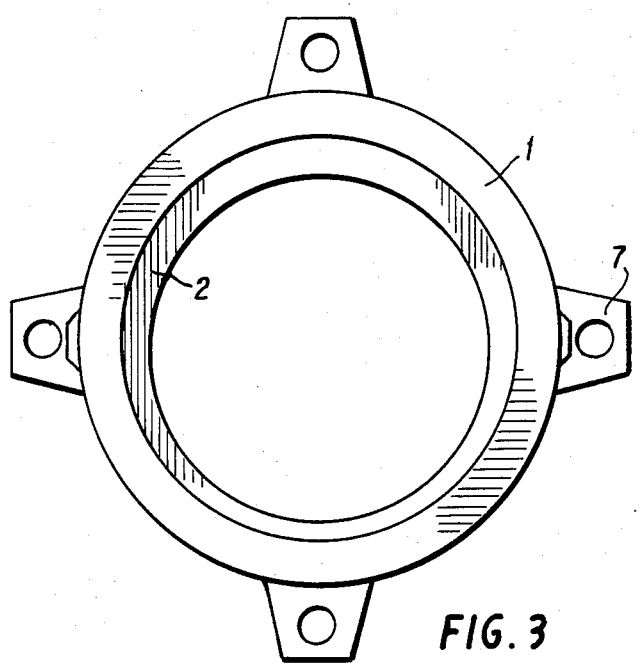
FIG. 3 is a front view of a nodular pipe according to another example of this invention.

Reference numbers (1A)–(1G) designate nodular pipes defined by splitting the bend angle of R of the pipe by a required number, for example 7 such nodular pipes are illustrated in the FIG. 3. Wear resistant pipes 2 are applied as linings on the inside of the nodular pipes, each two adjacent nodular pipes (1A)–(1G) being coupled via a packing (3), thereby forming an articulate bent pipe with an axis X—X.

The nodular pipes are manufactured of easily weldable steel, various types of cast iron, aluminum alloys, FRP, various resins, etc. The pipe illustrated in the figure was manufactured from SC46 cast steel by casting.

In assembling the nodular pipes into a bent pipe, a packing (3) is interposed between the joining surfaces of each two of the nodular pipes. For packing, asbestos packing, resins, rubber packing, etc., are available. Normally, use of liquid packing agent is favorable, the assembling being done after applying it on respective joining surfaces. Asbestos packing impregnated with liquid packing may also be utilized.

Various methods may be used for replaceably fixing the assembled nodular pipes. In the example of FIGS. 1 and 2, welding is employed. Flat bars (4) are placed along curved lines on the outwardly and the inwardly bent sides of the bent pipe and the nodular pipes are fixed by filet welding as at (5). This method is recommended for welding of small diameter pipes made of easily weldable material. It permits easy replacement of parts. Instead of using the flat bars (4) of FIG. 1, spot welding at appropriate intervals along the junction line of each two nodular pipes is also possible. Numeral (6) in FIG. 1 refers to a positioning mark for assembling the nodular pipes; it may be either indented or a protruded line.

Figure 4:
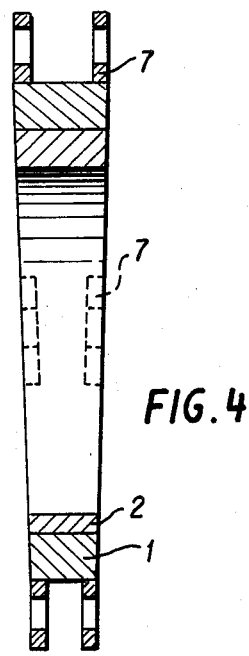
FIG. 4 is a side view of the nodular pipe of FIG. 3.

In the case of large diameter bent pipes or of nodular pipes of unweldable materials, as shown in FIGS. 3 and 4, flanges (7) are provided in positions on each nodular pipe corresponding to the 12, 3, 6 and 9 o'clock positions. These pipes are assembled with a packing (3) interposed at the joint between each two nodular pipes (1) and opposing flanges (7) clamped to each other by bolts. Other clamping methods are available. In this instance, one of the facing flanges may be provided with a free hole, while the other may have a tapped hole, thereby to effect fastening. Or they may be substituted by continuous circumferential flanges.

For the material of wear resistant pipes (2), various types of sintered hard alloys, wear resistant cast alloys or ceramics, bricks, refractories, glass, weld metals, etc., are used. The wear resistant pipe (2) may be fused with or welded to or entirely separated from the nodular pipe (1) at the joint part. For example, ceramic pipes may be bonded to the nodular pipe with adhesive or screw-fitted by threads. Or they may merely be inserted inside the nodular pipe. However, there should not be much clearance left between the nodular pipe (1) and the wear resistant pipe (2).

The nodular pipes (1) have appropriate split angles α, e.g., 5°, 10°, etc. The smaller the split angle, the more fully is a circle approximated, when the pipes (1) are combined, whereby fluid flow will become smoother.

In the case of transport media like coke, clinker and fly ash which cause violent grinding wear long life cannot be ensured for the wear resistant pipe (2) which is in contact with such abrasive media at high speeds unless it is very hard and made with a substantial thickness. Extra hard materials such as above described, although very hard, are defective in that they are liable to break even under a small impact. Such impact, especially if received on an edge part, will readily cause breakage. Ceramics are especially vulnerable in this way.

The wear that a bent pipe suffers from transport medium results from erosion wear as above described. Under the condition of erosion wear, the wear degree of the wear resistant pipe (2) differs depending on the incident angle of the transporting medium, a maximum wear generally taking place around an incident angle of 30°.

According to "Wear and Hard Facing 6.3 Erosion" by Yuko Ito, "If the injection angle is small, grinder particles merely slide on the sample surface; thus, consumption of particles' energy is small, with only slight cutting action. However, as the angle becomes larger, particles begin to give the sample cutting action on its surface. At an angle of 30°, the particles' energy is spent most effectively for cutting. As the angle exceeds 30°, part of the energy is used for initial cutting, but the remaining part is spent for transformation and melting. This transformation and melting are not directly reflected in the amount of wear; therefore, when the angle is in excess of 30°, the amount of wear will gradually diminish."

In bent pipes, a situation approximate to this will develop. Thus the inside surface of the wear resistant pipes applied on the inner surface of the outwardly bent side (i.e., the radially outer side of the bend) of the upstream nodular pipes with regard to the flow direction of the transport medium (i.e., nodular pipes 1A–1E) will sustain wear. As this surface approaches an angle of 30° to the upstream straight pipe, its wear becomes maximized. Especially when such surface has a front (upstream axial) edge of each wear resistant pipe exposed to the stream, breakage of the wear-resistant pipe is liable to result from direct collision cutting wear. In the case of erosion wear, if an edge of a wear resistant pipe (2) is once broken, that part is eroded still deeper, finally developing into large local pitting. When replaceable nodular pipes (1) are formed into a bent pipe assembly with a packing interposed between each two of them, the joint between each two nodular pipes becomes incontiguous; as a result, the front edge of the joint of each two wear resistant pipes is directly exposed to the collision by the abrasive medium. As it is hit in this way repeatedly, edge breakage will occur and, as a consequence, wear might proceed deeper and deeper from such broken part. Accordingly, in manufacturing articulate bent pipes, treatment of the joint part poses an important factor for improvement of wear resistance.

Figure 5:
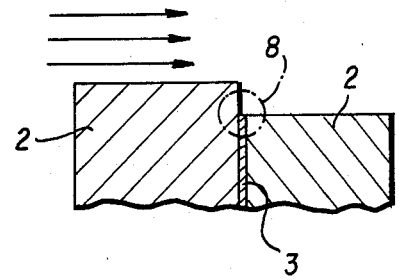
FIG. 5 is a schematic diagram for showing the effect on the flow of the transport medium when the front edge of a wear resistant pipe is formed lower than the rear edge of another neighboring wear resistant pipe located one node upstream of the former.

The present invention does not form on a common surface the edges of respective wear resistant pipes (2) in the flow direction (arrow direction in FIG. 2) of the transport medium. Instead, the front edge of each wear resistant pipe at the inside surface of the outwardly bent side of each nodular pipe (1B, 1C, 1D and 1E in FIG. 1) near the bent part on which the transport medium directly collides, is positioned lower than the rear (downstream axial) edge of the upstream adjacent pipe (i.e., further from the axis X—X). With this configuration, as shown in FIG. 5, the front edge (inside the circle) of the wear resistant pipe is not exposed to a collision by the stream of abrasive medium, which will merely slide on the flat surface. Accordingly, collision stresses are small, thus hardly causing edge breakage.

The step 8 thus formed between the rear edge of one wear resistant pipe and the front edge of the following one is normally adequate at 1–2 mm, but if the step 8 is sized larger than the clearance at the joint between nodular pipes, it will not only prevent edge breakage, but also has a remarkable effect of protection against wear of packing material in the clearance between nodular pipes. In forming this step 8, it is advantageous, for durability sake, to reduce the nodular pipe thickness T1 (at the outwardly bent side), while holding constant the thickness T2 of the wear resistant pipe. For example, as seen in FIG. 2, T1 is reduced for nodular pipe 1D as compared to nodular pipes 1A and 1G, whereas T2 is constant for all of the wear resistant pipes 2.

On the other hand, the inwardly bent side of the pipe does not sustain direct collision of transport medium, unlike the outwardly bent side. Thus, its wear is small there and, therefore, such a step need not be provided between wear resistant pipes. They may extend on a common plane. The aforementioned steps 8, as explained in reference to the example of FIG. 2, are provided up to the nodular pipe 1E, but beyond that, nodular pipes are on a common plane and its rear edge side thickness is increased to gradually restore the former inner diameter (ID) dimension.

Wear of the bent pipe occurs normally at a part of the inner surface of its outwardly bent side where it directly receives the most violent collisions from the transport medium. It presents an appearance of local wear. The articulate bent pipe of this invention permits easy replacement of only the nodular pipes at the affected part, obviating the need of difficult partial repair or total replacement, as in the case of conventional bent pipes. Since the bent pipe varies with position as hereabove described (i.e., maximum at 30°), for the articulate bent pipes of this invention, liner materials (wear resistant pipes) which have different wear resistances may be used in respective positions. For example, referring to FIG. 1, the nodular pipes (1C) and (1D) sustain the most violent wear. Therefore, for wear resistant pipes for this part, ceramics or sintered hard alloys, etc., are employed. For nodular pipes (1A), (1B), (1E) and (1F), high chrome cast iron is used for wear resistant pipes. But for pipe (1G) which is reduced in diameter (due to T1 there being enlarged) to match the inlet ID, thus resulting in resumption of violent collisions, ceramics or sintered hard alloys, etc., are used. In that way, appropriate wear resistant materials are combined, so that wear may be controlled to proceed at a uniform overall rate, thereby preventing any turbulent flow phenomenon resulting from local water.

With the front edge of the wear resistant pipe on each nodular pipe at the bent part on which violent direct collisions of transport medium occurs being formed lower than the rear edge of the upstream adjacent wear resistant pipe, edge breakage and packing wear are inhibited, thereby to effect further extension of the bent pipe's useful service life.

By providing successive steps 8 between the front edge of a wear resistant pipe and the rear edge of an upstream adjacent resistant pipe, as above described, the bent pipe's inside diameter is successively increased at 1D and then reduced toward 1G, so that the flow rate of the transport medium is slowed at the bent part where the abrasion is heaviest. As a result, the collision stress is reduced, resulting in further lessened of breakage and slower advancement of wear.

To be sure, the bent pipe may be composed merely with the front edge of a wear resistant pipe on each nodular pipe formed lower than the rear edge of its upstream adjacent wear resistant pipe without successively increasing the ID at the bent part, and in the bent part as a whole, the average ID for all parts may be made equal to the ID of the straight pipe, but no change in flow rate can then be obtained.

With several types of nodular pipes each having different split angles (e.g., 2.5°, 5°, 10°, etc.) arranged on hand, bent pipes having many bending angles like 45°, 90°, 135° or 225°, etc., may be freely and readily created.

EXAMPLE

A 90° bent pipe made of carbon steel for pump transport of abrasive carborundum having ID 143 $\phi$ and thickness 11 mm which was designated as Comparative Example No. 1 and a similar one made of a high chrome cast iron of C: 2.7% and Cr: 27% and having ID 143 $\phi$, its inwardly bent side thickness 11 mm and its outwardly bent side thickness 16 mm, which was designated as Comparative Example No. 2, were compared with the bent pipe of this invention shown in FIG. 1.

In the bent pipe of this invention as above-described, the nodular pipe (1) was made of SC46 cast steel and the wear resistant pipe (2) was formed in the following manner: On the inside of the nodular pipes (1) was eccentrially placed a water cooled copper flask with a clearance formed between the nodular pipes and the circular copper flask, within which clearance a single layer thick weld metal was formed by way of electrogas welding, using a wire of high carbon, high chrome niobium base carbide hardened metal of C: 5.5%, Cr: 22% and Nb: 7%. The wear resistant pipe (2) had thicknesses of approximately 10 mm on its inwardly bent side and approximately 20 mm on its outwardly bent side and was fused with the nodular pipe (1) of SC46 at the joining part. The hardness obtained of the wear resistant pipe was HRC60-63.

Results of comparative tests conducted by pump transport of an abrasive carborundum which gives far higher grindability than the aforementioned fly ash showed that pitting was observed respectively after 5 days operation in Example No. 1 and after 30 days operation in Example No. 2. In contrast, the bent pipe of this invention bore use of approximately 120 days without pitting.

Thereafter, observation of wear conditions revealed particularly heavy wear on the nodular pipes (1C) and (1D). Such parts were replaced with new nodular pipes and the bent pipe was again put to use. It was found to have borne further 90 days use without pitting. The nodular pipes (1C) and (1D) were repaired by padding and thereby made again usable.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An articulate bent pipe for transport of powder and slurry, comprising:
   a plurality of section shaped nodular pipes;
   a wear resistant pipe lining applied on the interior of each said nodular pipe;
   packing means positioned between each said nodular pipe and each adjacent said nodular pipes; and
   means for securing said nodular pipes together to form said bent pipe;
   including means for forming a step between adjacent axial edges of adjacent ones of some of said wear resistant pipe linings only at a radially outer side of said bent pipe, wherein said means for forming a step comprises means for reducing the thickness of said nodular pipe at said radially outer side of said bent pipe as compared to that of an upstream adjacent nodular pipe in a flow direction of said powder and slurry, while maintaining constant the thickness of said wear resistant pipe linings, and wherein the thickness of said nodular pipes at said radially outer side of said bent pipe is decreased for nodular pipes having said some of said pipe linings applied therein as compared to nodular pipes downstream therefrom, whereby an inner diameter of said bent pipe is decreased at said downstream nodular pipes.

2. The pipe of claim 1, wherein said means for forming a step is not provided on said wear resistant pipe linings downstream of said some of said pipe linings, and wherein said steps are formed such that an inner surface of one of said some of said wear resistant pipe linings at an upstream axial edge thereof is positioned further from the axis of said bent pipe than an inner surface of an upstream adjacent wear resistant pipe lining at a downstream axial edge thereof, whereby said upstream axial edge is protected from direct collisions with powder and slurry in said pipe.

3. The pipe of claim 1, wherein said means for securing comprise flange means on said nodular pipes and bolts connecting said flange means.

4. The pipe of claim 1, wherein said means for securing comprise flat bars welded to said nodular pipes.

5. The pipe of claim 1, wherein said wear resistant pipe linings for different ones of said nodular pipes within a single bent pipe are formed of different materials selected as a function of the wear characteristic at different positions within said bent pipe where said linings are located.

* * * * *